United States Patent [19]
Kobayashi

[11] Patent Number: 5,681,670
[45] Date of Patent: Oct. 28, 1997

[54] ELECTRODE SUPPORT IN A MULTILAYER CELL

[75] Inventor: Yuukichi Kobayashi, Tokyo, Japan

[73] Assignee: Mitsubishi Chemical Corporation, Tokyo, Japan

[21] Appl. No.: 687,675

[22] Filed: Jul. 26, 1996

[51] Int. Cl.⁶ .............................. H01M 4/02; H01M 4/72
[52] U.S. Cl. ........................ 429/208; 429/211; 429/233
[58] Field of Search ................................. 429/211, 209, 429/233, 208, 149, 160, 161

[56] References Cited

U.S. PATENT DOCUMENTS 5,434,017  7/1995  Berkowitz et al. ................. 429/211 X
5,456,813  10/1995  Grange-Cossou et al. .......... 429/211 X
5,585,206  12/1996  Morris ................................. 429/211 X

*Primary Examiner*—Anthony Skapars
*Attorney, Agent, or Firm*—McAulay Fisher Nissen Goldberg & Kiel, LLP

[57] ABSTRACT

An electrode support in a multilayer cell, comprises an electrode material coating portion and an electrode lead portion which are formed integrally from a metal sheet, wherein a plurality of electrode lead portions are formed integrally with said metal sheet. In such electrode support, the process for joining each of the electrode lead portions is accomplished by folding the sheet in an extremely easy manner.

1 Claim, 5 Drawing Sheets

ELECTRODE SUPPORT IN A MULTILAYER CELL

BACKGROUND OF THE INVENTION

The present invention relates to an electrode support in a multilayer cell and a method of manufacturing the same, and more particularly, it relates to an electrode support in a multilayer cell in which an electrode material coating portion and an electrode lead portion are formed integrally with a metal sheet and the joining processing between each of the electrode lead portions is extremely easy, and a method of manufacturing the same.

In recent years, electric automobiles have been developed as automobiles free from public pollution for improving the atmospheric environment. For electric cells mounted in electric automobiles, high voltage and large capacity, for example, as 300 V–65 A are demanded. Accordingly, a cell system (cell assembly) in which a plurality of cells are assembled in series and parallel are adopted for cells used in electric automobiles. In addition, a cell system having not a rolled type electrode structure but a multilayer type electrode structure is adopted for externally releasing heat generated in the inside of the cells, thereby preventing excessive cell temperatures.

FIG. 5 is an explanatory view of an electrode support in the prior art multilayer cell. Since electrode supports in the prior art are independent on every sheet, it is necessary to prepare a multilayer electrode by coating an electrode material on an electrode material coating portion 1, stacking the obtained electrodes and then joining each of the thus stacked electrode lead portions 2 by mechanical tightening or soldering.

The electrode support in the prior multilayer cell involves a drawback of injuring the electrode material upon stacking the electrodes obtained by coating the electrode material on an electrode material coating portion, and in addition, of requiring joining of a number of electrode lead portions when solder bonding.

In view of the above, there has been sought an electrode support which can facilitate bonding or joining processing between each of the electrode lead portions and which can reduce the number of steps in the joining process.

As a result of the present inventors' earnest studies, it has been found that by forming a strip-like electrode lead portion, a plurality of connecting portions branched from the electrode lead portion, a plurality of rectangular electrode material coating portions each branched from each of the said connecting portions from a metal sheet; forming a first folding line portion at a boundary between each of the electrode lead portions and each of the connecting portions; forming a second folding line portion at an oblique line on each of the connecting portions; forming a third folding line portion and a fourth folding line portion at each of horizontally traversing lines of an intermediate portion and a final portion of each of the electrode lead portions corresponding to an electrode material coating portion; folding each of the second folding line portions upwardly or downwardly while the first folding lines remain unfolded, or folding each of the first folding line portions and each of the second folding line portions upwardly or downwardly with the folding directions being different between the first and second folding line portions; and upwardly and downwardly folding the third line portions and the fourth folding line portions, the obtained electrode support of a multilayer cell is useful as an electrode support of an electric cell for use in automobiles. The present invention has been attained based on the findings.

SUMMARY OF THE INVENTION

An object of the present invention is to provide an electrode support which can facilitate the joining process between each of the electrode lead portions and which can decrease the number of joining processing steps, as well as a method of manufacturing the same.

To accomplish the aim, in a first aspect of the present invention, there is provided an electrode support in a multilayer cell, comprising an electrode material coating portion and an electrode lead portion which are formed integrally with a metal sheet, wherein a plurality of electrode lead portions are formed integrally with the metal sheet.

In a second aspect of the present invention, there is provided an electrode support in a multilayer cell, comprising:

an electrode material coating portion and an electrode lead portion which are formed integrally with a metal sheet, a plurality of electrode lead portions being formed integrally with the metal sheet, strip-like electrode lead portions formed with the metal sheet, a plurality of connecting portions branched from the electrode lead portions, a plurality of rectangular electrode material coating portions each branched from each of the connecting portions, a first linear folding line portion formed at a boundary between each of the electrode lead portions and each of the connecting portions, a second linear folding line portion formed as an obliquely traversing line of each of the connecting portions, a third liner folding line portion and a four linear folding line portion formed at a horizontally traversing line in an intermediate portion and a final portion of each of the electrode lead portions corresponding to the electrode material coating portion, wherein each of said second folding line portions is folded upwardly or downwardly while the first folding lines remain unfolded, or each of the first folding line portions is folded upwardly or downwardly and each of the second folding line portions is folded downwardly or upwardly respectively such that the first and second folding line portions are folded in different between directions, and the third folding line portions and the fourth folding line portions are folded alternately upwardly and downwardly.

In a third aspect of the present invention, there is provided a method of manufacturing an electrode support in a multilayer cell comprising;

forming a strip-like electrode lead portion, a plurality of connecting portions branched from said electrode lead portion, a plurality of rectangular electrode material coating portions each branched from each of the connecting portions from a metal sheet, forming a linear first folding line portion at a boundary between each of the electrode lead portions and each of the connecting portions, forming a second folding line portion at an oblique line on each of the connecting portions, forming a third folding line portion and a fourth folding line portion at each of linear lines horizontally traversing an intermediate portion and a final portion of each of the electrode lead portions corresponding to an electrode material coating portion, folding each of said second folding line portions upwardly or downwardly without folding each of the first folding lines, or folding each of the first folding line portions and each of the second folding line portions upwardly or downwardly with the folding method being different respectively between both of the first and second fold line portions, and alternately folding upwardly and downwardly the third folding line portions and said fourth folding line portions.

DETAILED DESCRIPTION OF THE INVENTION

An electrode support 10 of the present invention is formed from a metal sheet. As the metal sheet, aluminum, stainless steel, copper or the like is used. The thickness of the metal sheet is usually within a range from 10 to 100 µm, preferably 10 to 50 µm. The electrode support 10 comprises an electrode material coating portion 1 and an electrode lead portion 2, and both of them are formed integrally by the metal sheet. That is, the electrode is formed by coating an electrode material on the surface of the metal sheet. However, the electrode material is not coated to a portion at one end of the metal sheet, and such a not-coated portion is used as the electrode lead portion.

Figure 1:
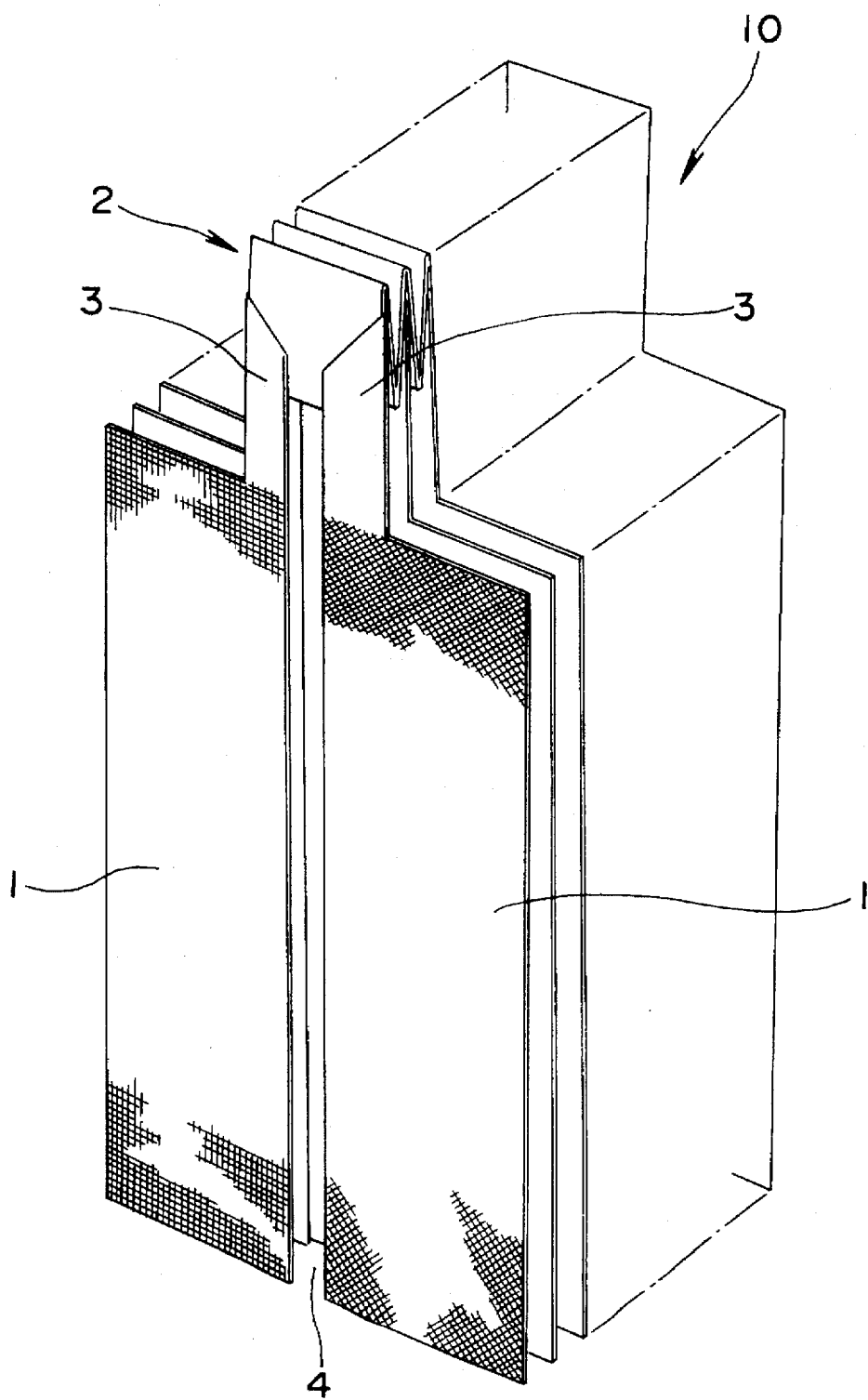
FIG. 1 is an explanatory view illustrating a preferred embodiment of an electrode support according to the present invention.

The electrode support 10 according to the present invention is obtained in accordance with the manufacturing method to be described later, by folding the metal sheet downwardly and upwardly. An electrode support 10 illustrated in FIG. 1 is constituted by, for example, two right and left rows for enabling parallel disposition of cathodes and anodes. The electrode material coating portion 1 is formed in a rectangular shape, while the electrode lead portion 2 is formed as a rectangular shape which is, as a whole, smaller than the electrode material coating portion when it is partitioned on extension lines of a corresponding electrode material coating portion 1. A reference numeral 3 attached to a portion of the electrode lead portion 2 designates a connecting portion for the convenience of explanation.

The connecting portion 3 is vertically extended from one longitudinal end of the electrode material coating portion 1 and a vertical line thereof situates on an extension line of the electrode material coating portion 1. The size for each of the electrode material coating portion 1, the electrode lead portion 2 and the connecting portion 3, and a gap 4 between the two rows of electrode support are properly determined considering, for example, the aimed size (electric capacity) of the cell.

In the electrode support 10 according to the present invention, a plurality of electrode lead portions 2, 2, . . . for a plurality of electrode supports of a stacking structure are formed integrally and the number thereof is properly determined considering electric capacity or the like. The integrally formed electrode lead portions are continuously interconnected through a folded structure.

Figure 2:
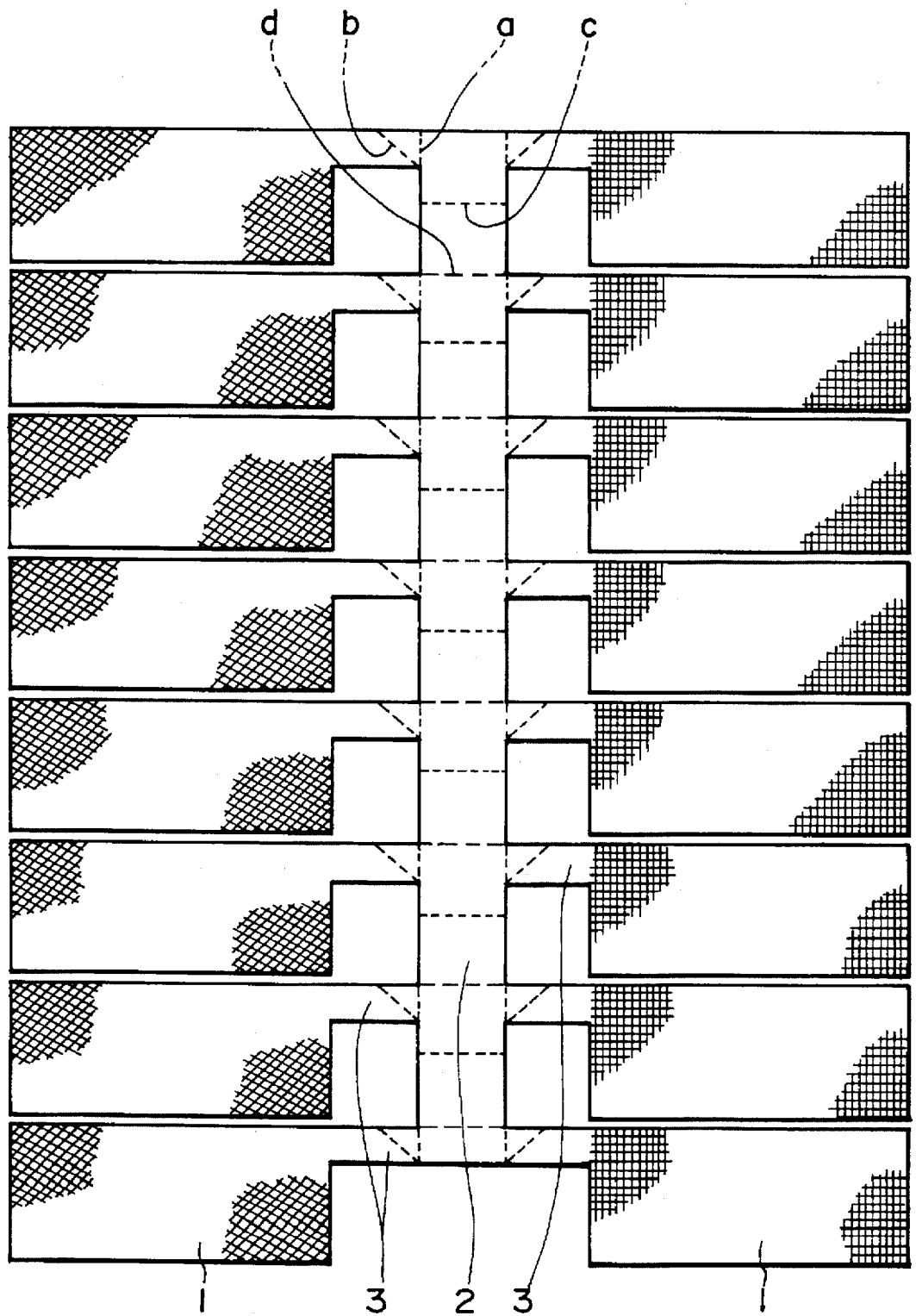
FIG. 2 is a developed explanatory view of another preferred embodiment of an electrode support according to the present invention.
Figure 3:
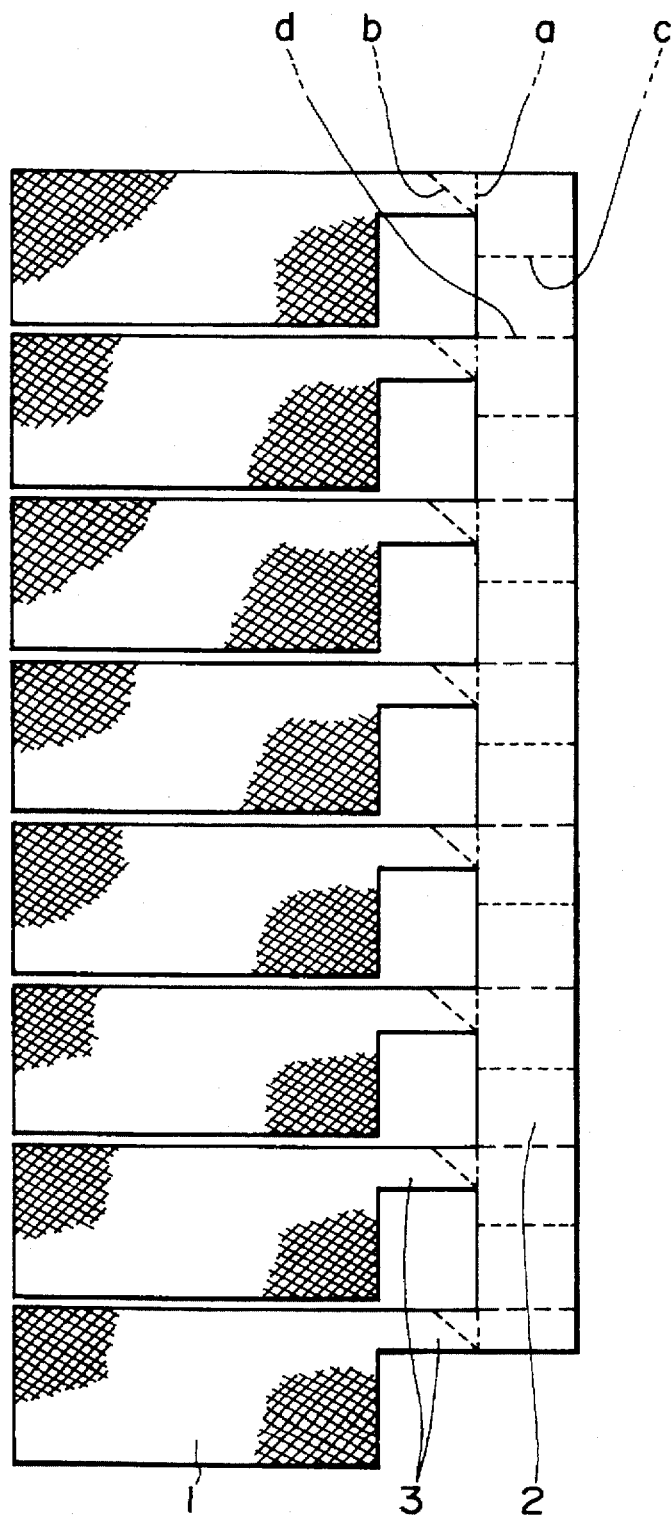
FIG. 3 is a developed explanatory view of another preferred embodiment of an electrode support according to the present invention.

The electrode support of the present invention is manufactured, for example, by using a metal sheet having a shape as shown in FIGS. 2 and 3. Usually, an electrode support of a two-row structure is obtained from the metal sheet shown in FIG. 2, while an electrode support of 1-row structure is obtained from a metal sheet shown in FIG. 3.

At first, a strip-like electrode lead portion 2, a plurality of connecting portions 3 branched from the electrode lead portion 2 and a plurality of rectangular electrode coating portions 1 branched from the connecting portions 3 respectively are formed from the metal sheet. Then, a boundary line formed between each of the electrode lead portions and each of the connecting portions is defined as a first folding line portion (a). An oblique line in each of the connecting portions 3 is defined as a second folding line portion (b). Each of the linear lines horizontally traversing an intermediate portion and a final portion of each of the electrode lead portions corresponding to one electrode material coating portion are defined as a third folding line portion (c) and a fourth folding line portion (d) respectively.

Then, the illustrated connecting portion 3 has a rectangular shape that is branched at a right angle from the strip-like electrode lead portion 2, but the shape of the connecting portion 3 has no particular restriction so long as it does not influence on folding and stacking to be explained later. The rectangular shape of the connecting portion 3 is made smaller than the rectangular shape of the electrode material coating portion 1, but there is no particular restriction. However, by making the size of the rectangular shape shorter than that of the third folding line portion (c), the succeeding folding and stacking can be made easily.

Further, the illustrated second folding line portion (b) is a hypotenuse of a right-angled triangle including the first folding line portion (a), which is upward from the electrode lead portion 2 to the electrode material coating portion 1. However, it may be an oblique line which is downward from the electrode lead portion 2 to the electrode material coating portion 1. Further, it is not always necessary to be formed as a right-angled triangle including the first folding line portion (a).

Then, each of the folding line portions (b) is folded either upwardly or downwardly without folding each of the first folding line portions (a), or the first folding line portions (a) and the second folding line portions (b) are each folded either downwardly or upwardly, with the folding method being different between both of the first folding line portion and the second folding line portion. Then, the third folding line portions (c) and the fourth folding line portions (d) are alternately folded upwardly and downwardly. The order of folding them may be selected optionally.

The electrode support shown in FIG. 1 is obtained by folding each of the first folding line portions (a) and the second folding line portions (b) using the metal sheet of the shape shown in FIG. 2. Specifically, it is obtained by upwardly folding the first folding line portions (a) and the third folding line portions (c), while downwardly folding the second folding line portions (b) and the fourth folding line portions (d).

An electrode support according to the present invention (not illustrated) can also be obtained by folding each of the second folding line portions (b) either upwardly or downwardly without folding each of the first folding line portions (a) using the metal sheet of the shape shown in FIG. 2. In this case, since right and left electrode material coating portions 1 of the metal sheet of the shape shown in FIG. 2 overlap with each other, a one-row structure is obtained.

By the way, in the metal sheet of the shape shown in FIG. 2, the shape of the connecting portion 3 is formed as the rectangular shape branched at a right angle from the strip-like electrode lead portion 2, while the shape of the electrode material coating portion 1 is formed as a rectangular shape branched at a right angle from the connecting portion 3 relative to the electrode lead portion 2 and having a width larger than the lead portion 2. That is, the upper sides for each of the rectangular electrode material coating portion 1, the rectangular connecting portion 3 and the corresponding lead electrode portion 2 are extended on a straight line. Alternatively, in the case of using a metal sheet of a shape in which the lower sides for each of the rectangular electrode material coating portions 1, the rectangular connecting portions 3 and the corresponding electrode lead portions 2 are extended on a straight line by downwardly displacing the connecting portions 3 in the metal sheet of the shape shown in FIG. 2 (not illustrated). An electrode support of a two-row structure similar to that shown in FIG. 1 can be obtained by folding each of the second folding line portions (b) either upwardly or downwardly without folding each of the first folding line portions (a).

When the electrode material is coated on the electrode material coating portion 1, it is preferred to previously form a pattern indicating each of the portions and each of the folding line portions on the metal sheet since this facilitates the coating and folding processing of the electrode material. Such a pattern can be formed easily, for example, by printing.

In the present invention, metal sheets of the shape shown in FIG. 3 may be constituted with different materials and both of them may be joined previously at the electrode lead portions to each other for use. The electrode structure of such a structure has a two-row structure shown in FIG. 2 in which materials are different between right and left portions. This is utilized in a case where it is required that the materials for the electrode support have to be different between the positive electrodes and the negative electrodes.

Further, in the present invention, the number of the plurality of electrode lead portions formed integrally is selected optionally as described previously. Accordingly, the metal sheet of the shape shown in FIG. 2 or FIG. 3 in which each row comprises 8 pieces can be prepared by joining metal sheets in which each row comprises 2 or 4 pieces at electrode lead portions to each other. The joining of the electrode lead portions in the direction of stacking is utilized, for example, in a case where it is difficult to fold a number of pieces at once because of a large area for the electrode material coating portion or because of a large number of pieces to be stacked.

In the present invention, the joining of the electrode lead portions may be sometimes required, for example, by the necessity for using different kinds of metals or for the convenience of preparation depending on the area or the number of stacked pieces. However, since such joining can be conducted before coating the electrode material to each of sheets of the electrode support, the joining processing is easy and the electrode material is scarcely damaged upon joining of the electrode lead portion. In addition, since the electrode support according to the present invention has a structure of integrally forming a plurality of the electrode lead portions, the number of joining steps can be decreased and the number of joining positions is decreased. It is, of course, possible for such a structure that all electrode lead portions are formed integrally depending on the capacity or the kind of the cell.

Since cells for use in electric automobiles are used under extremely violent vibrating conditions with start or stopping and during running of a vehicle, the connection failures are liable to be caused by the occurrence of defects in the joined portions. However, since the steps of joining processing can be decreased or saved in the electrode support according to the present invention, it can be used suitably, particularly, as an electrode support of a cell for use in electric automobiles.

The electrode support according to the present invention can be utilized to various kinds of secondary cells. For instance, a lithium secondary cell can be exemplified. The lithium secondary cell is constituted, for example, by using a composite metal oxide comprising Li ions and a predetermined metal as a positive electrode active substance, and a carbonaceous material as a negative electrode active substance, interposing a separator membrane between the positive electrode and the negative electrode to form a multilayer electrode, and using an aprotic organic solvent comprising Li salt dissolved therein as an electrolyte.

There can be used properly, for example, $LiCoO_2$, $LiNiO_2$, $LiMnO_2$ and $LiFeO_2$ as the composite metal oxide. There can be used properly, for example, needle cokes, pitch cokes or graphite as the carbonaceous material. There can be used properly, for example, $LiBF_4$ and $LiClO_4$ as the Li salt. There can be used properly, for example, propylene carbonate, dimethyl sulfoxide, 3-methyl-1,3-oxazolidine-2-on, sulfolan, 1,2-dimethoxyethane and 2-methyltetrahydrofuran as the aprotic organic solvent.

Each of the electrodes is manufactured by blending each of electrode components (composite metal oxide and carbonaceous material) at a high concentration to a solution composed of a binder and a polar solvent to prepare an electrode material, coating the obtained electrode material on the surface of a collector, and then drying and sintering the obtained product. Polyvinylidene fluoride or the like is used for the binder and N-methyl-pyrrolidone or the like is used for the polar solvent. The drying and sintering treatment is usually conducted at a temperature from 300° to 400° C.

Figure 4:
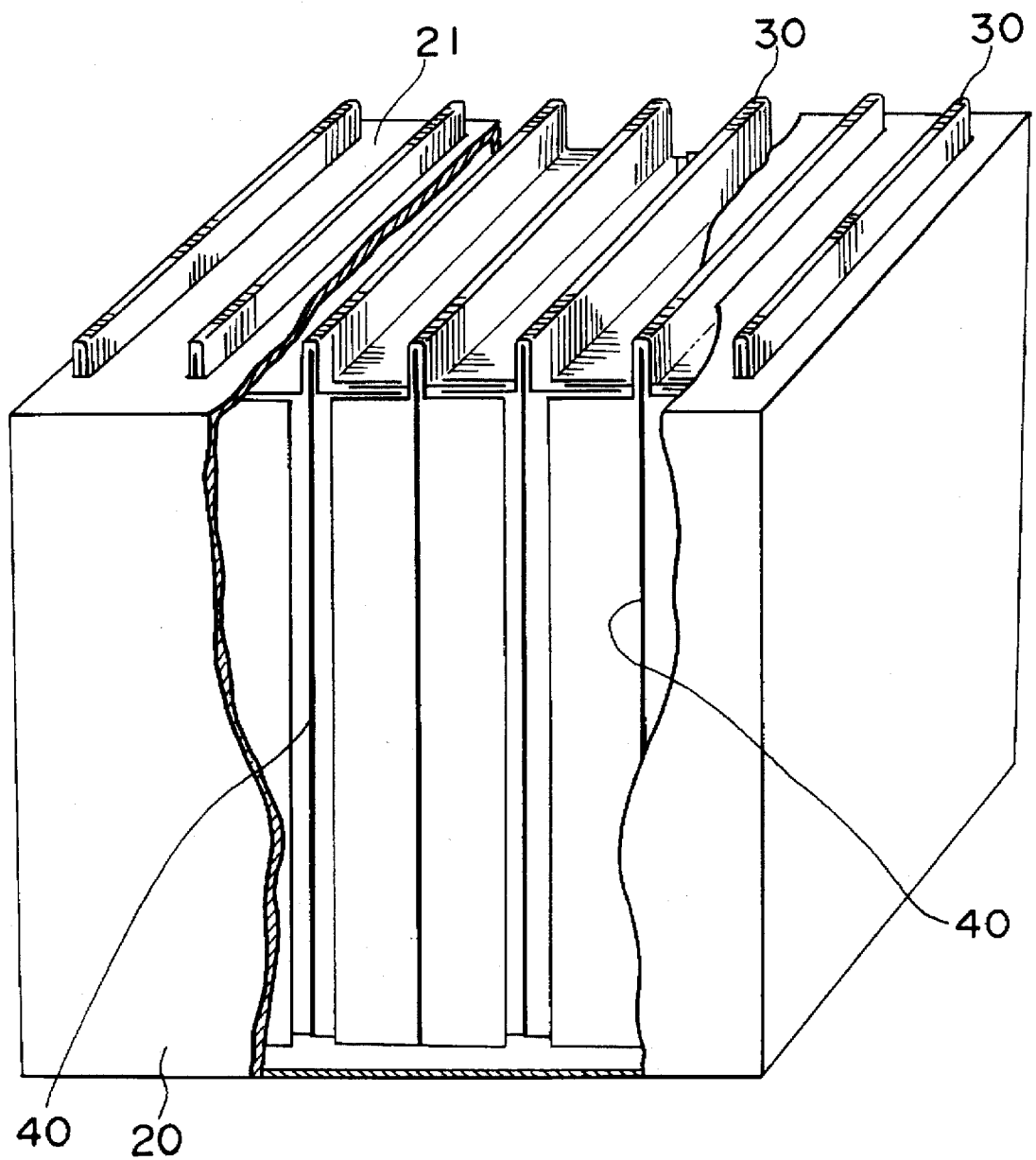
FIG. 4 is an explanatory view illustrating an example of an electric cell using an electrode support according to the present invention.
Figure 5:
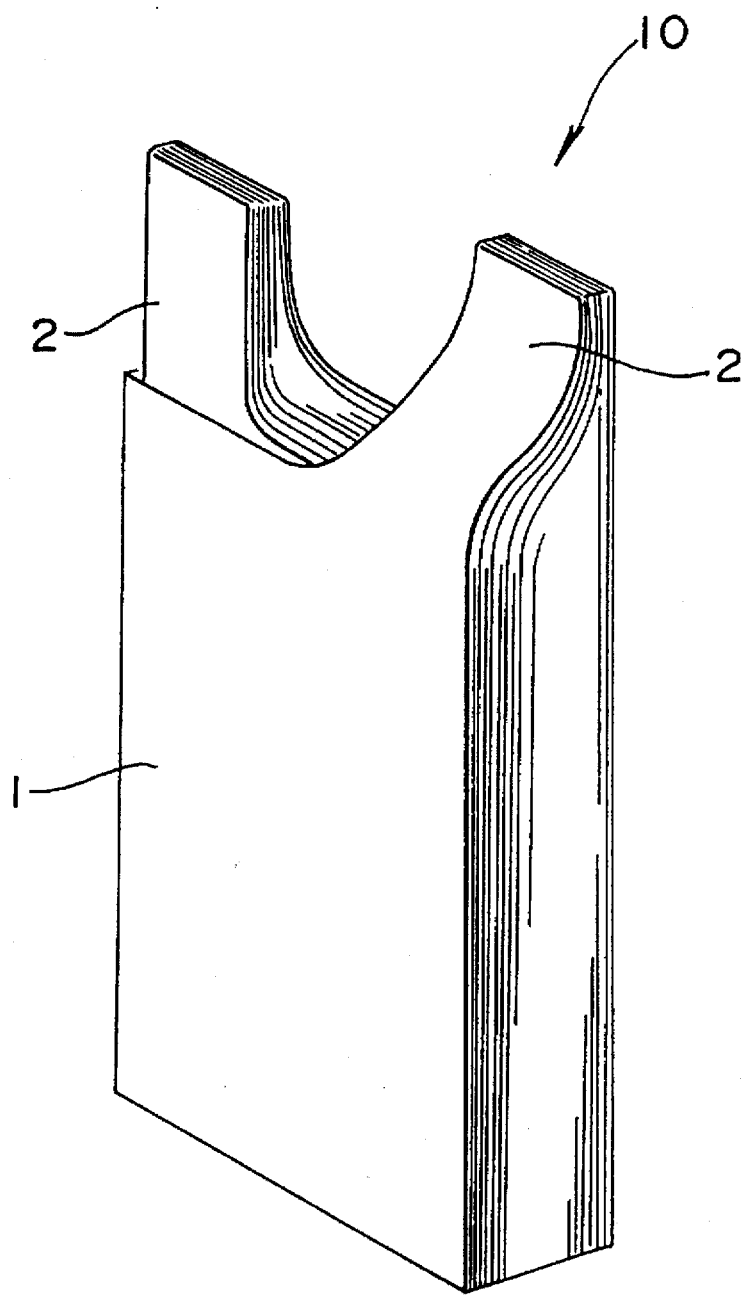
FIG. 5 is an explanatory view of an electrode support in a multilayer cell of the prior art.

The cell using the electrode support according to the present invention is constituted, as shown in FIG. 4, by disposing electrodes 30 in a container 20 containing an electrolyte, and exposing electrode lead portions from a lid 21 disposed above the container. The electrodes are assembled in various forms. For instance, as in the cell shown in FIG. 4, electrodes obtained from one row of electrode supports are disposed as electrodes on both ends, while pairs each comprising two sets of electrodes obtained from electrode supports of the two-row structure forming a row of positive electrodes and a row of negative electrodes are disposed between the electrodes on both ends. That is, a negative electrode plate of one electrode is put between positive electrode plates of the other electrode, while a positive electrode plate of the other electrode is disposed between negative electrode plates of one electrode.

A separator membrane (not illustrated) interposed between the positive electrode and the negative electrode may be disposed upon assembling the electrodes, but the separator membrane can be stacked to the electrode surface after coating and dry-sintering the electrode material on the electrode material coating portion before performing the folding processing, by the electrode support according to the present invention. The separating membrane can be formed easily by a method such as fusion of an insulation film or coating of an insulation material. It is a merit of the electrode support according to the present invention that the separator membrane can be formed by such a simple method. The partition wall 40 is disposed between the electrodes of the two-row structure upon assembling of the electrode.

As described above, according to the electrode support of the present invention, the joining processing between each of the electrode lead portions is facilitates and the number of joining steps can be reduced, or depending on the case, can be saved. Accordingly, the electrode support of the present invention can be used suitably, particularly, as an electrode support of an electric cell used for electric automobiles.

What is claimed is:

1. An electrode support in a multilayer cell comprising:

strip-like electrode lead portions formed from a metal sheet, a plurality of connecting portions branched from said electrode lead portions, a plurality of rectangular electrode material coating portions each branched from each of said connecting portions, a first linear folding line portion formed at a boundary between each of the electrode lead portions and each of the connecting portions, a second linear folding line portion formed as an obliquely traversing line to each of the connecting portions, a third linear folding line portion and a fourth linear folding line portion formed at a horizontally traversing line in an intermediate portion and a final portion of each of the electrode lead portions corresponding to an electrode material coating portion, wherein each of said second folding line portions is folded upwardly or downwardly while said first folding line remains unfolded or each of said first folding line portions and each of said second folding line portions are folded upwardly or downwardly with the folding direction being different between the first and second folding line portions, and said third folding line portions and said fourth folding line portions are folded alternately upwardly and downwardly.

* * * * *